(12) United States Patent
Ito

(10) Patent No.: US 6,367,773 B1
(45) Date of Patent: Apr. 9, 2002

(54) THROTTLE VALVE CONTROL DEVICE

(75) Inventor: Yoshiki Ito, Nagoya (JP)

(73) Assignee: Aisan Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/668,733

(22) Filed: Sep. 25, 2000

(30) Foreign Application Priority Data

Oct. 7, 1999 (JP) .......................................... 11-323093

(51) Int. Cl.[7] ................................................ F16K 1/22
(52) U.S. Cl. ................... 251/305; 29/890.128; 123/337; 137/15.25
(58) Field of Search ................................ 251/305, 308; 137/15.25; 123/337; 29/890.128

(56) References Cited

U.S. PATENT DOCUMENTS 4,860,706 A * 8/1989 Suzuki et al. ............... 123/337
5,146,887 A * 9/1992 Gluchowski et al. ........ 123/337
6,129,071 A * 10/2000 Pursifull ................. 123/339.15
6,176,467 B1 * 1/2001 Yamashita et al. .......... 251/305

* cited by examiner

Primary Examiner—Joseph A. Kaufman
Assistant Examiner—Patrick Buechner
(74) Attorney, Agent, or Firm—Oliff & Berridge, PLC

(57) ABSTRACT

A throttle valve control device provided with a throttle valve 3 formed in an elliptic shape such that a major axis is a center line 3c connecting mounting holes 3a and 3b for fixing the valve 3 to a throttle shaft 2. A clearance A is provided between an edge of the elliptic valve 3 in a minor axis and an inner wall of a throttle bore 1b configuring an intake passage, while the minimum open area needed for idle engine operation is provided. Even if deposits are accumulated in the bore 1b in the vicinity of the throttle shaft 2 at the idle operation, the throttle valve 3 further rotated in a reverse rotating direction at throttle valve non-control time can scrape off the deposits at a smaller rotational torque as compared with in the vicinity of the edge 3d of the valve 3.

13 Claims, 7 Drawing Sheets

| NOMINAL DIAMETER (mm) | DIAMETER OF MAJOR AXIS: $D_L$ (mm) | DIAMETER OF MINOR AXIS: $D_S$ (mm) | HORIZONTAL DIAMETER OF VALVE INCLINED IN PROCESS $=D_S$ | INCLINATION ANGLE IN MANUFACTURE: $\alpha$ |
|---|---|---|---|---|
| $\phi 40$ | 40.006 | 39.97 | | 2.431° |
| $\phi 45$ | 45.006 | 44.97 | ↓ | 2.431° |
| $\phi 50$ | 50.006 | 49.97 | ↓ | 2.431° |
| $\phi 55$ | 55.006 | 54.95 | ↓ | 2.476° |
| $\phi 60$ | 60.006 | 59.95 | ↓ | 2.476° |
| $\phi 65$ | 65.006 | 64.95 | ↓ | 2.476° |
| $\phi 70$ | 70.006 | 69.95 | ↓ | 2.476° |
| $\phi 76$ | 76.006 | 75.95 | ↓ | 2.476° |

THROTTLE VALVE CONTROL DEVICE

BACKGROUND OF THE INVENTION

1. Field of the Invention

The present invention relates to a throttle valve control device used for an internal-combustion engine and, more specifically, to a throttle valve structure which provides a clearance with respect to a throttle bore so as to allow a throttle valve to further rotate from a full closed position in a reverse rotating direction at throttle valve non-control time, while providing the minimum open area at idle engine time, and a producing method of such the throttle valve.

2. Description of Related Art

Figure 6A:
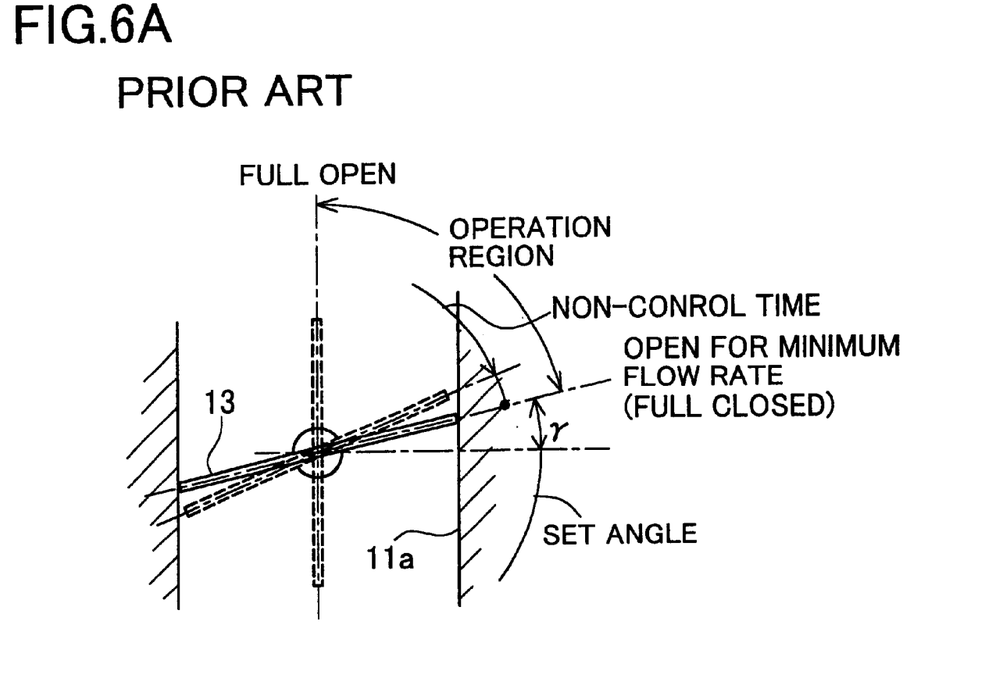
FIG. 6A is a schematic sectional view of a throttle valve control device in an operating state in a prior art.

Conventionally, there has been proposed a butterfly-valve type throttle valve mounted in an intake passage by means of a throttle shaft extending across the passage and used for controlling the amount of air to be supplied to an engine. One example of such a throttle valve is shown in FIG. 6A. A throttle valve 13 illustrated by a solid line in FIG. 6A is held as inclined at a predetermined set angle γ from a horizontal position in a throttle bore 11a forming an intake passage. This state is a full closed position, namely, an opening angle for the minimum flow rate of air. It is to be noted that the throttle valve 13 is rotated in a normal rotating direction (in a counterclockwise direction in the figure) from the full closed position to slightly open at idle operation of an engine. At this time, the valve 13 is operated with an open area shown by the diagonally shaded area in FIG. 6B. Therefore, viewing this throttle valve 13 from right above, perpendicular to its upper face, or showing it in plan view, as shown in FIG. 7B, the valve 13 has an elliptic shape with a major axis in a direction perpendicular to a center line 13c connecting screws 14 and 15, namely, a center axis of rotation of the valve 13.

Meanwhile, as disclosed in Japanese patent application laid-open No. 10-163827 (which corresponds to U.S. patent application Ser. No. 09/318,252) filed by the same applicant as that of the present invention, there has been proposed a throttle valve control device in which a throttle valve is further rotated by a predetermined angle from a full closed position in a reverse rotating direction to stop an engine at throttle valve non-control time such as engine stop.

If the throttle valve 13 having the above configuration is adopted in the throttle valve control apparatus disclosed in Japanese patent application laid-open No. 10-163827, the following disadvantages may rise.

Figure 7A:
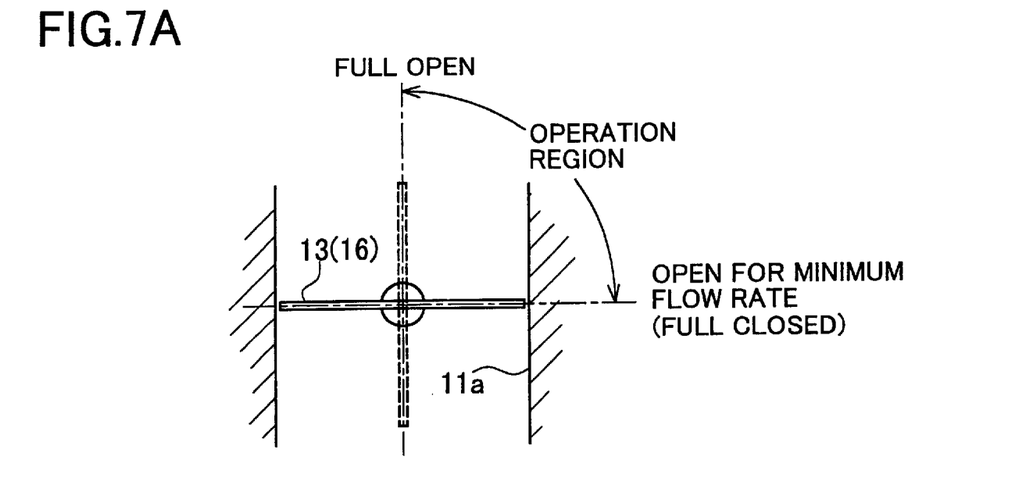
FIG. 7A is a sectional view of a prior art throttle valve control device in which a throttle valve is further rotated in a reverse rotating direction at throttle valve non-control time.

FIG. 7A is a sectional view showing an operating state of the throttle valve 13 in the throttle valve control apparatus wherein the valve will be further rotated from a full closed position indicated by a solid line in the figure in a reverse direction (clockwise in the figure) at throttle valve non-control time. In the above throttle valve control apparatus, as shown in FIG. 7B, if a clearance B needed for reverse rotation of the valve 13 is provided between the edge 13d in the major axis of the valve 13 positioned in the full closed position (a horizontal position) and the inner wall of a throttle bore 11a, a clearance C larger than the clearance B is produced in the vicinity of the rotating axis. Accordingly, the open area between the valve 13 and the bore 11a becomes so excessively large that the minimum open area needed for idle engine operation could not be ensured.

Figure 7B:
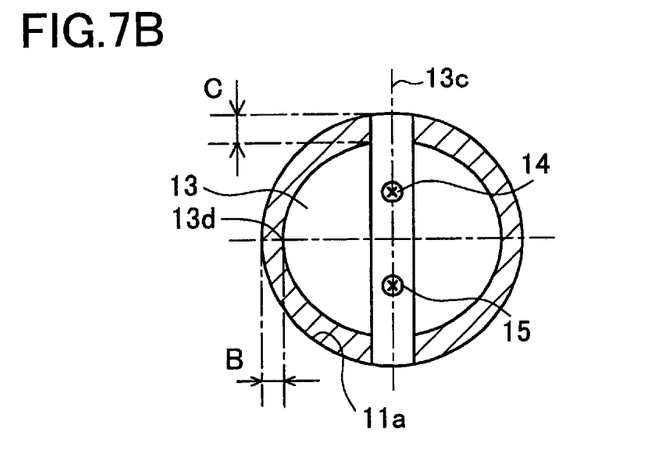
FIG. 7B is a top view of the prior art throttle valve of FIG. 6B adopted in the device of FIG. 7A, the valve being positioned in a horizontal state (in a full closed position)
Figure 7C:
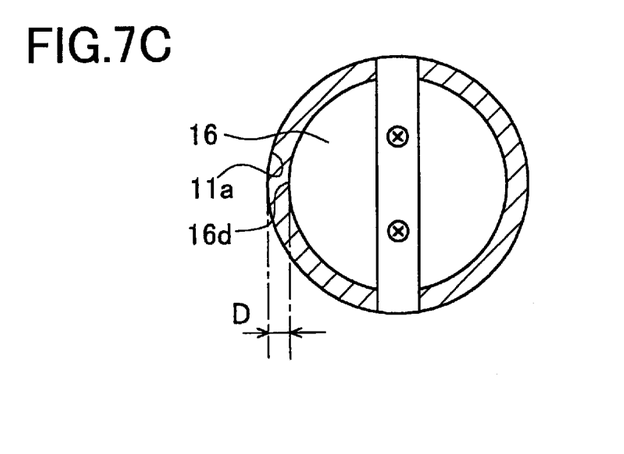
FIG. 7C is a top view of a perfect circular throttle valve adopted in the device of FIG. 7A, the valve being positioned in a horizontal state (in a full closed position).

On the other hand, an example of adopting a throttle valve 16 of a perfect circular shape in order to facilitate the reverse rotation is shown in FIG. 7C. When a clearance D needed for the reverse rotation of the valve 16 is produced between an edge 16d of the valve 16 and the bore 11a, the same clearance as D is produced in the vicinity of the rotating axis. As is the above case, the minimum open area needed for idle engine operation could not be ensured.

Figure 6B:
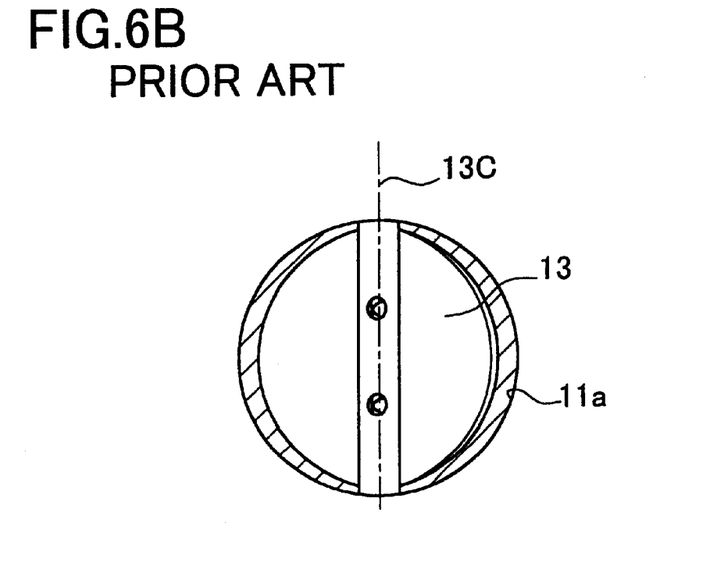
FIG. 6B is a top view of the device of FIG. 6A, the throttle valve being at idle engine operation.

It is to be noted that the clearances shown by the shaded areas in FIGS. 6B, 7B and 7C are exaggerated in shape and size than actual shape and size for the purpose of facilitating explanations.

SUMMARY OF THE INVENTION

The present invention has been made in view of the above circumstances and has an object to overcome the above problems and to provide a throttle valve control device capable of easily further rotating a throttle valve by a predetermined angle from a full closed position in a reverse rotating direction at throttle valve non-control time, while providing the minimum open area needed for maintaining a smooth idle engine operation, and a producing method of the throttle valve.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a throttle valve control device provided with a throttle valve for opening and closing an intake passage of an engine and a throttle shaft extending across the intake passage, the throttle valve being fixed to the throttle shaft and rotated in a normal direction from a full closed position to a full open position and in a reverse direction from the full open position to the full closed position to control output of the engine, and further rotated by a predetermined angle in the reverse direction from the full closed position to a predetermined open position at stop of the engine, wherein the throttle valve is formed in an elliptic shape of which a major axis is a center line connecting a plurality of mounting holes for fixing the throttle valve to the throttle shaft.

According to another aspect of the present invention, there is provided a throttle valve for opening and closing an intake passage of an engine, the throttle valve having an elliptic outer shape of which a major axis is a center line connecting a plurality of mounting holes for fixing the throttle valve to a throttle shaft.

Furthermore, according to another aspect of the present invention, there is provided a producing method of a throttle valve used in the throttle valve control device according to claim 1, the method including the steps of: holding a throttle valve material in a machine tool such that the center line connecting the mounting holes is inclined at a predetermined inclination angle with respect to a plane perpendicular to a processing axis of the machine tool; processing an outer periphery of the throttle valve material; reversing the throttle valve material 180° about the center line; and processing again the outer periphery to provide an elliptic throttle valve having predetermined major and minor axis diameters.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1A:
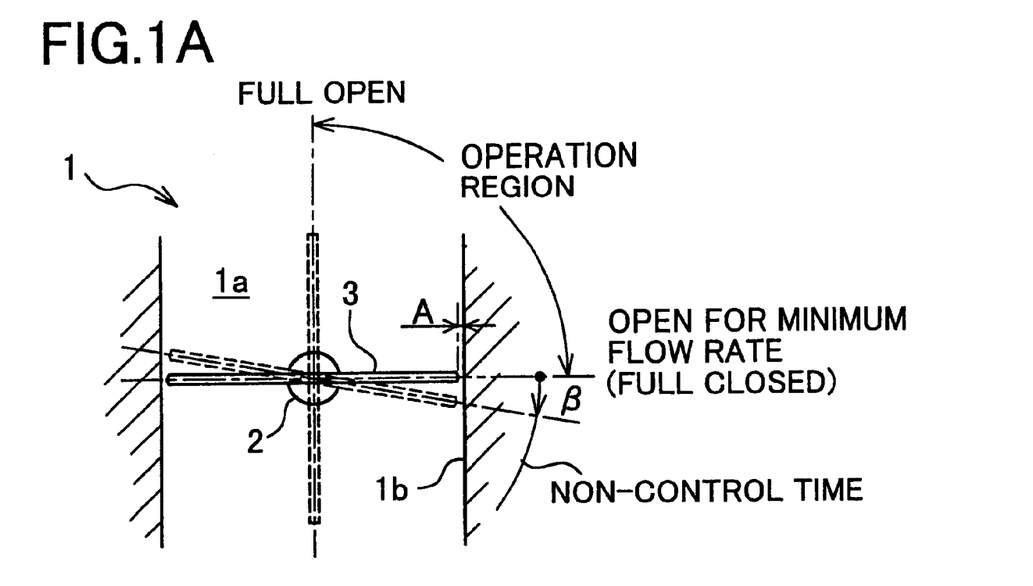
FIG. 1A is a schematic sectional view of a throttle valve control device in an operating state in an embodiment according to the present invention.
Figure 1B:
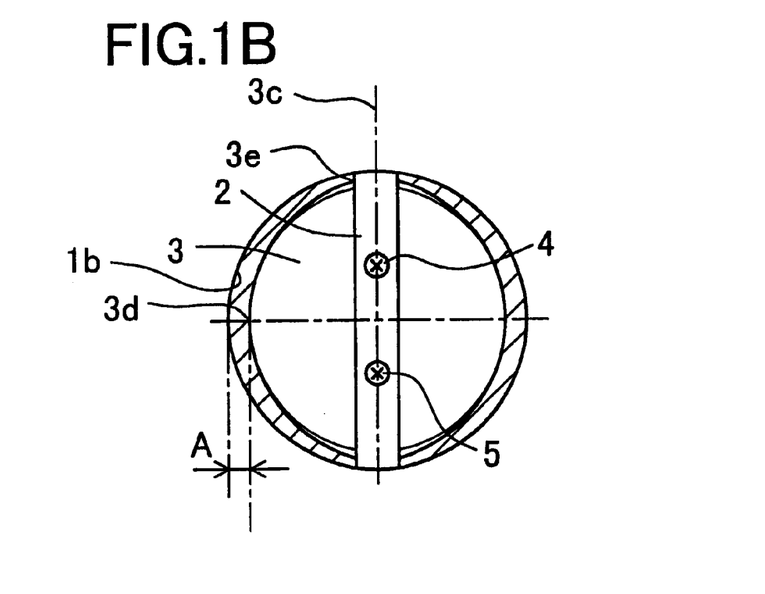
FIG. 1B is a top view of the device of FIG. 1A with the throttle valve positioned at an opening angle for the minimum flow rate.

A detailed description of a preferred embodiment of a throttle valve control device embodying the present invention will now be given referring to the accompanying drawings. FIG. 1A is a schematic sectional view of a throttle valve control device including a throttle body with a throttle valve operated in the present embodiment. FIG. 1B is a top view of the throttle valve control device with the throttle valve positioned at an opening angle for the minimum flow rate, namely, in a full closed position. In FIG. 1B, the diagonally shaded area indicates a clearance between the outer periphery of the throttle valve and the inner wall of a throttle bore, which is exaggerated in shape and size than actual shape and size for the purpose of facilitating explanations.

In FIGS. 1A and 1B, a throttle shaft 2 is rotatably mounted across an intake passage 1a provided in a throttle body 1 of the throttle valve control device in the present embodiment. A throttle valve 3 is fixed to the throttle shaft 2 by screws 4 and 5. This throttle valve 3 is formed in an elliptic shape having a major axis corresponding to a center line 3c connecting two holes 3a and 3b (see FIG. 3B; the screws 4 and 5 in FIG. 1B) for fixing the throttle valve 3 to the throttle shaft 2. The center line 3c thus corresponds to an axis of the shaft 2. The throttle valve 3 used in the present embodiment is of an elliptic shape having a nominal diameter of φ 60 mm (which is φ 60.006 mm in major axis diameter and φ 59.95 mm in minor axis diameter). The throttle valve 3 is provided at its outer periphery with beveled faces forming a ridgeline (3g: see FIG. 3A) at a center in a direction of valve thickness. Each of the beveled faces is formed so that the angle which each beveled face makes with each valve plane is larger at the edge in the major axis than in the minor axis.

There is produced a predetermined clearance A between an edge 3d of the throttle valve 3 in the minor axis and the inner wall of the throttle bore 1b so that the throttle valve 3 may be further rotated in a reverse direction (i.e., in a clockwise direction in FIG. 1A) from the full closed position to a desired position at non-control time. Since the throttle valve 3 is of the elliptic shape mentioned above and is fixed to the shaft 2 with the major axis aligned with the shaft 2, the clearance A provided between the edge 3d of the valve 3 in the minor axis and the inner wall of the bore 1b is reduced at an edge portion 3e of the valve 3 in the vicinity of the shaft 2. Thus, the total area of the clearance between the throttle valve 3 and the bore 1b can be provided as the minimum open area for maintaining the idle engine operation. The valve 3 can also be easily rotated in the reverse rotating direction from the full closed position at throttle valve non-control time, without contacting the inner wall of the bore 1b.

Furthermore, the throttle valve 3 is provided with the beveled peripheral faces formed so that the angle which the beveled face makes with the valve plane is larger at the major axis ends than the minor axis ends, thereby preventing the outer periphery of the valve 3 from abutting on the inner wall of the bore 1b, allowing a smooth reverse rotation of the valve 3. Next, explanation is made on an embodiment of a producing method of the above configured throttle valve 3, referring to FIGS. 2A to 2F. A throttle valve material 30 is punched in advance to have two oblong holes 3a and 3b for mounting a throttle valve to a throttle shaft by means of screws, the holes 3a and 3b each having a major axis on the major axis of the throttle valve 3. The valve material 30 is set in a machine tool such as a lathe so that the center line 3c connecting the holes 3a and 3b of the valve material 30 in the major axis is inclined at a predetermined angle α from a horizontal state and the center point of the valve material 30 is aligned with an axis 3f which is a processing axis of the machine tool. In this inclined state, the valve material 30 is rotated about the axis 3f while the outer periphery of the material 30 is processed. A semifinished throttle valve 30 is thus made.

Figure 2A:
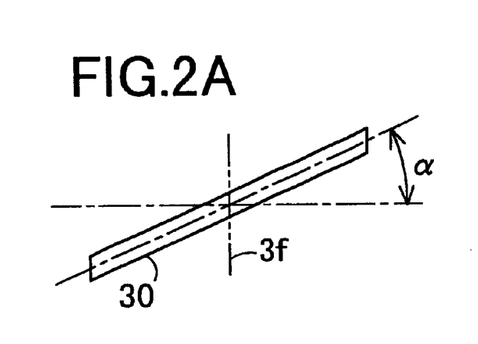
FIGS. 2A, 2C, and 2E are schematic side views of throttle valve materials in processing stages to produce the throttle valve according to the present invention.
Figure 2B:
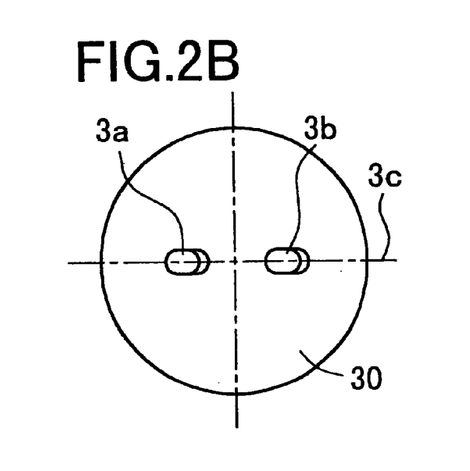
FIGS. 2B, 2D, and 2F are bottom views of the throttle valve materials of FIGS. 2A, 2C, and 2E, respectively.

The shape of the semifinished throttle valve 30 obtained after its outer periphery is processed as above is shown in FIGS. 2A and 2B. It is to be noted that the above processing method maybe chosen from lathing, pressing, grinding, laser-processing, and any other processing methods.

Figure 2C:
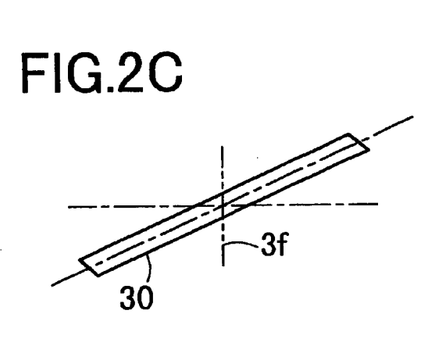
Figure 2D:
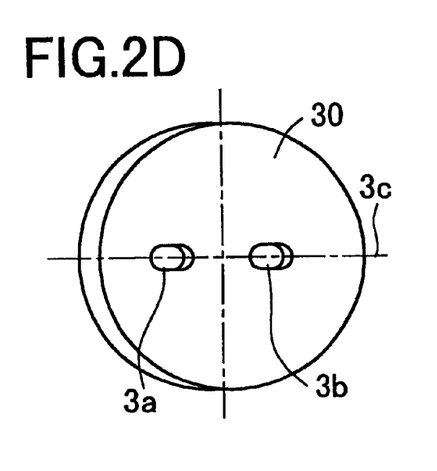
Figure 2E:
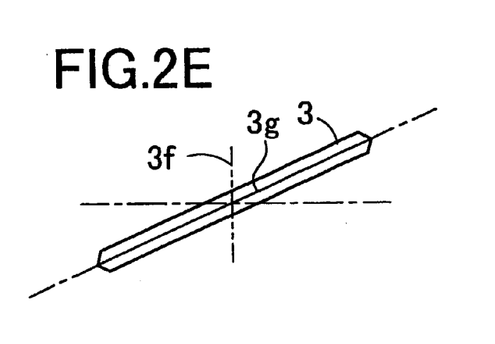
Figure 2F:
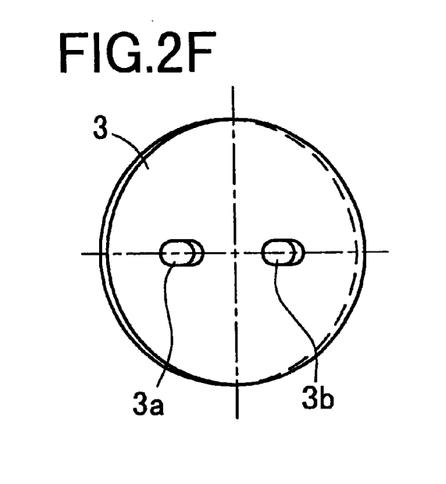

Subsequently, as shown in FIGS. 2C and 2D, the semifinished throttle valve 30 is reversed 180° about the center line 3c, namely, turned upside down. The valve 30 is fixed as inclined at the predetermined angle α in the same way as above. While the valve 30 is rotated again about the axis 3f of the lathe, the outer periphery of the valve 30 is processed to be beveled as shown in FIGS. 2E and 2F. Thus, a throttle valve 3 with predetermined major and minor axis diameters is completely produced.

Figure 3A:
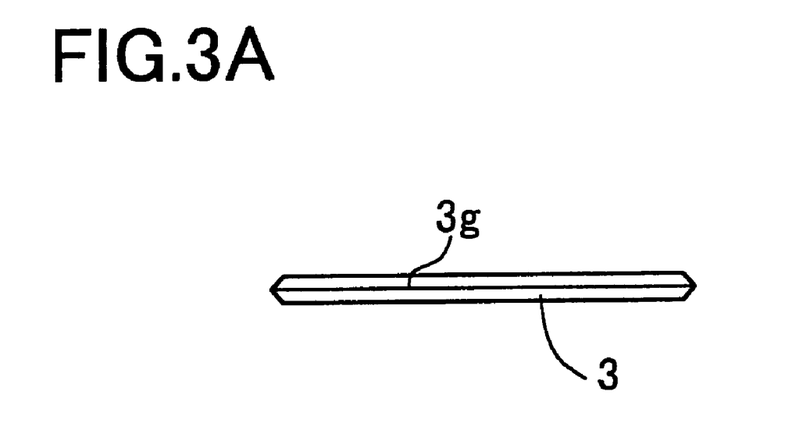
FIG. 3A is a side view of a finished throttle valve in the embodiment according to the present invention.
Figure 3B:
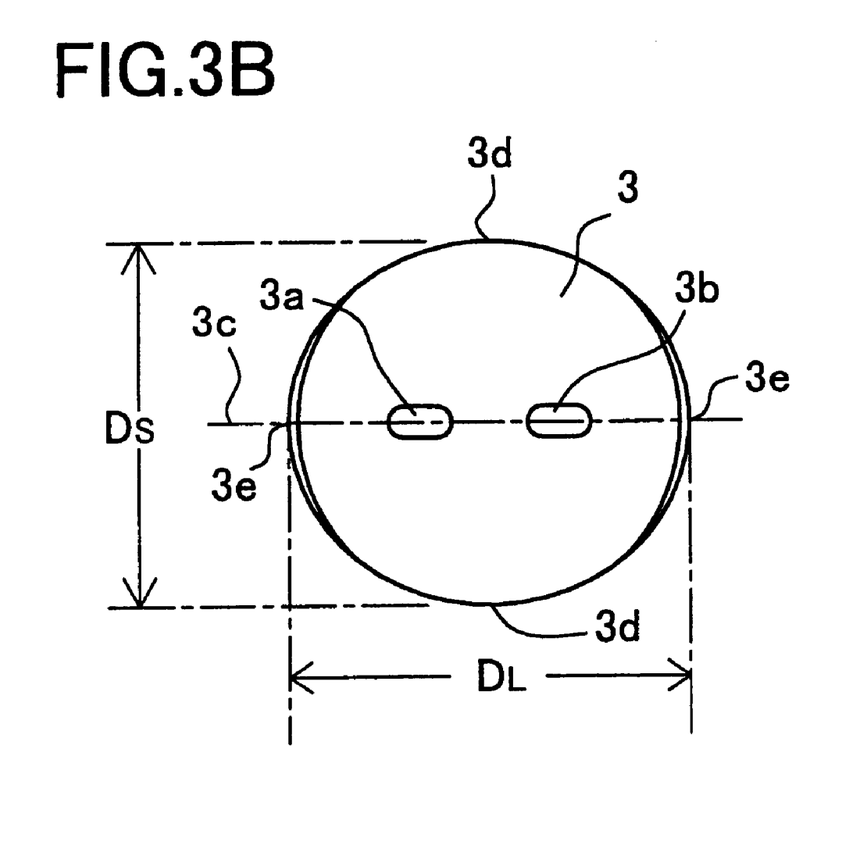
FIG. 3B is a top view of the throttle valve of FIG. 3A.

FIGS. 3A and 3B show a side view and a top view of the throttle valve 3 produced in the above producing method. The throttle valve 3 in the present embodiment is of a predetermined major axis diameter $D_L$ and a predetermined minor axis diameter $D_S$. The valve 3 is also provided, on its outer periphery, with beveled faces outwardly sloping from upper and lower valve planes to form a ridgeline 3g at the center in thickness of the valve 3. The beveled face is formed so that the angle which each beveled face makes with each valve plane is larger at the edge 3e in the major axis diameter $D_L$ than at the edge 3d in the minor axis diameter $D_S$.

Figure 4:
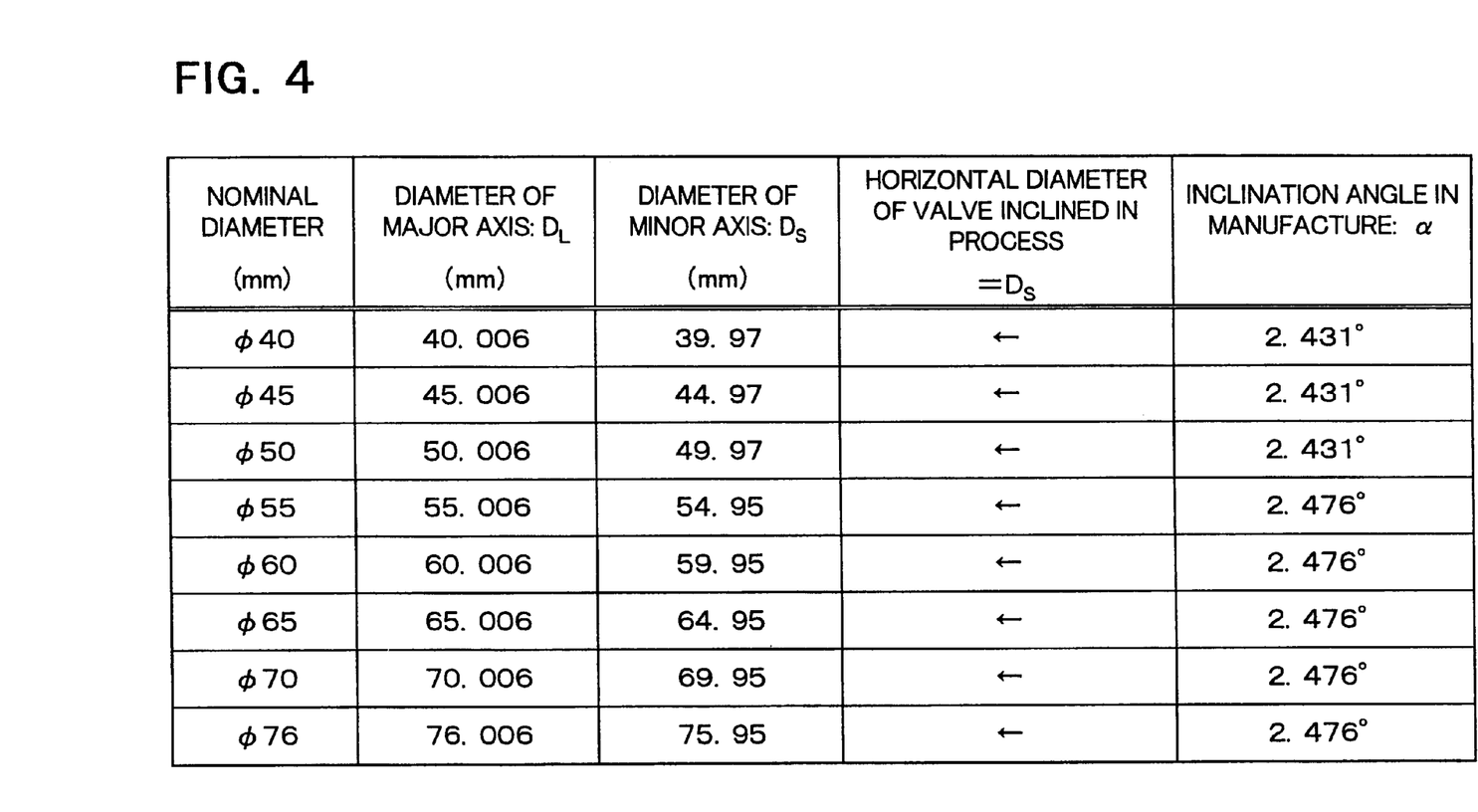
FIG. 4 is a table of standardized nominal diameters of throttle valves in the embodiment.

In the present embodiment, diameters of the throttle valve 3 are standardized. FIG. 4 is a table of standardized nominal diameters of the throttle valve 3, showing relationships between major axis diameters $D_L$, minor axis diameters $D_S$, and inclination angles α at which the throttle valve material 30 is inclined to be processed. For example, in case of the nominal diameter of φ 40 mm, the major axis diameter $D_L$ is φ 40.006 mm, the minor diameter $D_S$ is φ 39.97 mm, and the inclination angle α is 2.431°. In this case, a diameter of the bore 1b configuring the intake passage 1a is made slightly larger than φ 40 mm.

The throttle valve producing method can be applied to a single valve material 30 as above. It is however more efficient to process a plurality of valve materials 30 at a time as shown in FIG. 5.

Figure 5:
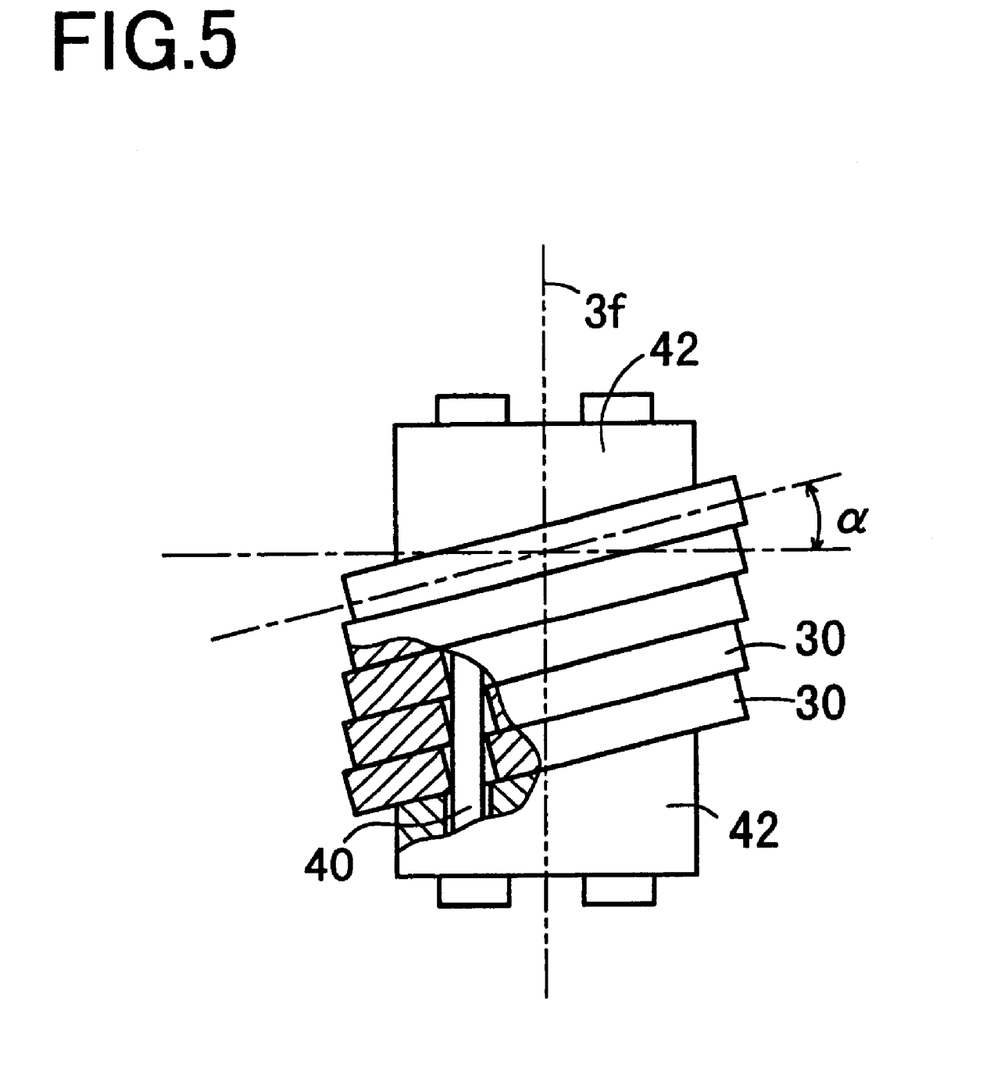
FIG. 5 is a schematic side view of a plurality of throttle valve materials set in a machine tool, which are to be processed as shown in FIGS. 2A–F.

To be more specific, as shown in FIG. 5, a plurality of throttle valve materials 30 (five materials in the present embodiment) are processed at a time in the following manner. At first, processing shafts 40 of for example a lathe are inserted into the holes 3a and 3b of the materials 30 coaxially placed one upon another. The materials 30 are then inclined at a predetermined angle α from a plane perpendicular to the axis 3f of the lathe (i.e., from a horizontal state) and fixedly held by means of fixing jigs 42 of the lathe. This inclination angle α is an angle standardized in advance in association with the nominal diameter of the throttle valve to be produced (see FIG. 4).

In the present embodiment, the holes 3a and 3b are oblong, allowing inclination of the valve materials 30 with respect to the processing shafts 40 inserted in the holes 3a and 3b. In addition, the oblong holes 3a and 3b accommodate component tolerances of the throttle valve 3 and throttle shaft 2 when they are actually fixed to each other.

It is to be noted that the mounting holes 3a and 3b may be formed after the outer periphery of the valve material 30 is processed into the above shape. In this case, for example, the valve material 30 is held in the machine tool with the valve planes directly supported by the jigs 42 without use of the processing shafts 40.

Next, explanation is made on operations of the throttle valve control device having the throttle valve 3 produced as above. In FIG. 1A, the throttle valve 3 is opened and closed within the operation region defined between the opening angle for the minimum flow rate (the full closed position) and the full open position to control the output of an engine. The direction from the full closed position to the full open position (a counterclockwise direction in FIG. 1A) is referred to as a normal rotating direction, and the opposite direction (a clockwise direction in FIG. 1A) as a reverse rotating direction. At idle engine operation time, the throttle valve 3 is rotated in the normal rotating direction from the full closed position and held in a slightly opened position. At throttle valve non-control time such as at engine stop, the throttle valve 3 is further rotated by a predetermined angle β from the full closed position (the opening angle for the minimum flow rate) in the reverse rotating direction to a slightly opened position illustrated by a dotted line in FIG. 1A, thereby preventing the valve 3 from freezing in extreme low temperature surroundings, thus preventing engine starting failures caused when the valve 3 could not open.

As mentioned above, the throttle valve 3 is configured to provide an adequate clearance A between the edge 3d and the inner wall of the bore 1b to allow reverse rotation of the valve 3 in the throttle bore 1b. Therefore the valve 3 can be smoothly rotated in the reverse rotating direction at the throttle valve non-control time. The valve 3 has an elliptic shape of which the major axis is the center line 3c fixed to the throttle shaft 2. Accordingly, even when the valve 3 is slightly rotated in the normal rotating direction at the idle operation, the total area of the clearance between the valve 3 and the bore 1b does not excessively increase, while sufficiently ensuring the minimum open area needed for the idle operation.

Since the clearance A is provided between the edge 3d of the throttle valve 3 and the bore 1b, deposits are rarely accumulated in the bore 1b in the vicinity of the edge 3d, but occasionally in the vicinity of the edge 3e. Even if deposits are accumulated in the bore 1b in the vicinity of the edge 3e, the throttle valve 3 in the embodiment scrapes the deposits off the inner wall of the bore 1b when the valve 3 is rotated in the reverse rotating direction at the non-control time. At this time, the valve 3 can scrape the deposits accumulated in the vicinity of the edge 3e at a smaller rotational torque as compared with the edge 3d.

The present invention may be embodied in other specific forms without departing from the spirit or essential characteristics thereof. The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A throttle valve control device provided with a throttle valve for opening and closing an intake passage of an engine and a throttle shaft extending across the intake passage, the throttle valve being fixed to the throttle shaft and rotated in a normal direction from a full closed position to a full open position and in a reverse direction from the full open position to the full closed position to control output of the engine, and further rotated by a predetermined angle in the reverse direction from the full closed position to a predetermined open position at stop of the engine, wherein the throttle valve is formed in an elliptic shape of which a major axis is a center line connecting a plurality of mounting holes for fixing the throttle valve to the throttle shaft.

2. The throttle valve control device according to claim 1, wherein the throttle valve is formed at an outer periphery with beveled faces outwardly sloping from valve planes, forming a ridgeline at a center in thickness of the throttle valve.

3. The throttle valve control device according to claim 2, each is formed so that an angle which each makes with the valve plane is larger at an edge of the throttle valve in the major axis than at an edge in a minor axis.

4. The throttle valve control device according to claim 1, wherein the elliptic throttle valve is formed in a manner of holding a material of the throttle valve in a machine tool such that the center line connecting the mounting holes is inclined at a predetermined inclination angle with respect to a plane perpendicular to a processing axis of the machine tool, processing an outer periphery of the throttle valve as inclined, reversing the valve material 180° about the center line, and processing again the outer periphery of the valve material.

5. The throttle valve control device according to claim 4, wherein each of the mounting holes is of an oblong shape such that the material of the throttle valve is held as inclined at the predetermined angle with respect to the plane perpendicular to a processing shaft of the machine tool when the processing shaft is inserted in the mounting hole.

6. A throttle valve for opening and closing an intake passage of an engine, the throttle valve having an elliptic outer shape of which a major axis corresponds to a center line connecting a plurality of mounting holes for fixing the throttle valve to a throttle shaft.

7. The throttle valve according to claim 6, wherein an outer periphery of the valve is formed with beveled faces outwardly sloping from valve planes, forming a ridgeline at a center in thickness of the throttle valve.

8. The throttle valve according to claim 7, the beveled face is formed so that an angle which each beveled face makes with the valve plane is larger at an edge of the throttle valve in the major axis than at an edge in a minor axis.

9. The throttle valve according to claim 6, wherein the elliptic throttle valve is formed in a manner of holding a material of the throttle valve in a machine tool such that the center line connecting the mounting holes is inclined at a predetermined inclination angle with respect to a plane perpendicular to a processing axis of the machine tool, processing an outer periphery of the throttle valve as inclined, reversing the valve material 180° about the center line, and processing again the outer periphery of the valve material.

10. The throttle valve according to claim 9, wherein each of the mounting holes is of an oblong shape such that the material of the throttle valve is held as inclined at a predetermined angle with respect to the plane perpendicular to a processing shaft of the machine tool when the processing shaft is inserted in the mounting hole.

11. A producing method of the throttle valve according to claim 6, the method including the steps of:

holding a throttle valve material in a machine tool such that the center line connecting the mounting holes is inclined at a predetermined inclination angle with respect to a plane perpendicular to a processing axis of the machine tool;

processing an outer periphery of the throttle valve material;

reversing the throttle valve material 180° about the center line; and processing again the outer periphery to provide an elliptic throttle valve having predetermined major and minor axis diameters.

12. The throttle valve producing method according to claim 11, wherein the throttle valve material is rotated about the processing axis of the machine tool while the outer periphery of the valve material is processed.

13. The throttle valve producing method according to claim 11, wherein the throttle valve material is formed in advance with a plurality of oblong mounting holes such that each major axis of the holes corresponds to the major axis of the valve material.

* * * * *